Patented Mar. 8, 1927.

1,620,067

UNITED STATES PATENT OFFICE.

HARRY E. BROOKBY, OF CHICAGO, ILLINOIS, AND GEORGE D. KING, OF FORT DODGE, IOWA, ASSIGNORS TO UNITED STATES GYPSUM COMPANY, OF CHICAGO, ILLINOIS, A CORPORATION OF ILLINOIS.

CELLULAR PLASTER.

No Drawing.   Application filed January 9, 1926. Serial No. 80,342.

Our invention relates to a composition of matter by means of which we are able to produce light weight cellular heat and sound insulation products that consist essentially of gypsum (plaster of Paris), which composition of matter is of the same general type as, but an improvement upon, those described in United States Patent No. 230,151, granted July 20th, 1880, to D. C. Sanford.

The final products obtained as light casts of cellular structure by gauging the dry mixture of our present invention with water are of uniform texture and possess a high degree of firmness and hardness because of their great uniformity. Moreover, our final products are quick drying as a result of the ingredients employed therein which comprise relatively small quantities of water-soluble materials.

As an illustration of one of our improved compositions of materials we employ a mixture preferably comprising the following ingredients:

Partially calcined gypsum (plaster of Paris)___ 100 parts
Aluminum sulphate_____ from 6 parts to 3 parts
Granular sodium bicarbonate___ from 2.8 parts to 0.45 parts
Dextrinized starch (HHH gum)_____ about .2 parts
Soap bark_____ from .1 parts to 0.05 parts to which may be added, if desired, fine silica sand or pulverized quartz—10 parts.

In order to control the degree of porosity of the final cellular structure and the volume of the final product, variations in the foregoing proportions of the ingredients may be made advantageously and particularly with respect to the proportions of sodium bicarbonate, aluminum sulphate and soap bark. For example, by the employment of granular sodium bicarbonate .7 parts, aluminum sulphate 4 parts, dextrinized starch .2 parts and soap bark .06 parts to each 100 parts of gypsum and 10 parts of fine silica sand, a light cellular cast is obtained on gauging the mixture of the foregoing ingredients in the proportions specified with water, which cast possesses substantially 250 percent of the initial volume of the dry ingredients employed therein; whereas by using 2.8 parts of granular sodium bicarbonate, 6 parts of aluminum sulphate, .2 parts of dextrinized starch, and .1 part of soap bark to each 100 parts of gypsum and gauging the same it is possible to obtain a still lighter cellular cast having substantially 500 percent of the initial volume of the dry ingredients.

The aforesaid difference in the character of the cellular structure of the casts obtainable with our improved composition of materials serves to illustrate one of the advantages of our present invention, since we are able thus to produce, by variations in the proportions of the ingredients employed, final products each varying widely in the texture of the cellular casts. Moreover, final products of predetermined texture, weight and volume can be obtained from the same quantities of ingredients comprising the dry mixtures. This control of the weight, the volume and the texture of the cellular casts results from the absence of after-rise (i. e. rise of the mass after pouring) and to the fact that there is little, if any, loss of volume or variation of volume in the casts produced from mixes comprising the same proportions of ingredients. Also, we have been able to produce cellular casts having different weights per cubic foot by varying, in the manner described, the proportions of the ingredients that are employed in producing our cellular structure.

In our new composition of materials we employ granular sodium bicarbonate or sodium bicarbonate granules as distinguished from sodium bicarbonate in powdered form. Granular particles of sodium bicarbonate are capable of being substantially uniformly distributed throughout the mass both in the dry mix and in the mortar resulting from the addition of water to the dry mix, because these granules are free running and do not tend to coalesce or lump-up in the manner of powdered sodium bicarbonate in the absence of thorough and extensive agitation and mixing of the ingredients. Since granular sodium bicarbonate does not tend to float on the surface of the water and react there, as would obtain with some of the bicarbonate of soda if in powdered form, substantially all of the gas evolved is utilized in expanding uniformly the mass, thus producing cellular casts of greater porosity for a given amount of granular bicarbonate of soda as compared with a similar quantity of powdered bicarbonate of soda. When granulated sodium bicarbonate is employed the reaction is expedited thus minimizing the tendency of the mortar to rise after it has been poured.

In our present composition of materials, the absence of after-rise when the mortar or gauged mixture has been poured is important because workmen will be enabled to fill the molds accurately and to procure level and smooth tops for the molds or casts whereas, if an after-rise of the mass obtained, the gauged mixture or mortar would either expand too much or too little and thus the casts or molds would possess uneven and irregular surfaces. It is important for a cast or a mold to possess a uniform and even surface when the cast is employed for the roofing or flooring of a building structure, otherwise time must be spent in screeding or leveling the mortar after it has been poured into place and sometimes after the mortar has begun to stiffen or set. Even careful screeding under such circumstances often results in producing an uneven, rough and bumpy surface for the cast if the gas producing ingredients therein are non-uniformly distributed, such as will occur when powdered sodium bicarbonate is employed that has not been thoroughly disseminated throughout the mass. However, when sodium bicarbonate granules are employed they are aided by their own mechanical dissemination in being uniformly distributed throughout the mass of the mortar and, consequently, the difficulty of producing an even surface for the cast is substantially obviated since the mortar will expand almost uniformly throughout without an after-rise.

For entangling the gas and holding it within the mass of the mortar until the mortar sets we preferably employ powdered soap bark which we have found to be highly efficient as a gas entangler. While we are aware that it has been proposed to use wheat flour or resin as a gas entangling agent, as well as glutinous, mucilaginous, saponaceous and gummy materials, we prefer soap bark because a relatively small amount thereof will act efficiently to entangle the gas.

Soap bark as the gas entangling agent also expedites rapid and satisfactory drying of the mortar after it is poured. We have found that the efficiency of soap bark as the gas entangling agent of our mixture results from the fact that it is a foam stabilizer. In our mixture soap bark readily goes into solution and collects in the films or envelopes of the surrounded gas bubbles thereby increasing the viscosity of the film forming liquid constituting the walls of the bubbles. By reason of this reenforcing of the films of the gas bubbles, the bubbles are not likely to break through their films thereby allowing the gas within the bubbles to expand without disrupting them. The more efficient the gas entraining agent and foam stabilizer, the fewer will be the number of gas bubbles that are broken and, consequently, less gas is lost from the mass. The size and the enlargement of the gas bubbles are thus controlled and the cells in the final product are maintained at their desired size.

By reason of the efficiency of soap bark as a gas entangling agent a relatively small quantity of this ingredient is employed in our composition of materials.

In addition to soap bark, we also employ in our mixture a relatively small quantity of dextrinized starch which is commercially known as HHH gum. This product serves to impart strength or tenacity to the foaming mass or mortar and also to prevent efflorescence in our gauged mixture. We are aware that heretofore it has been proposed to use glue or glucose or molasses or glycerine in conjunction with a gas entangling agent. We have discovered that dextrinized starch is a highly satisfactory auxiliary agent being particularly beneficial for the effect which it has upon the soap bark. Dextrinized starch possesses a tendency to absorb slightly the soap bark thereby reducing the tendency of the soap bark to form an independent foam in the gauged mixture which would result in the formation of soft spots in the final product. Furthermore, as above stated, dextrinized starch appears to enhance the gas entangling efficiency of the soap bark and to inhibit the tendency of the gauged mass to effloresce. Efflorescence may be described as the superficial deposition in the form of clusters of solid salts which, in a dissolved condition, have migrated from the interior of a cellular mass along with the water when the latter is drawn in the process of evaporation from the interior to the exterior surface of said mass.

Again, dextrinized starch in the gauged mixture appears to form with the water a semi-permeable membrane which, while allowing the moisture to diffuse therethrough, tends to prevent the passage through the membrane of the dissolved salts which otherwise would accumulate on the surface by reason of the moisture passing into an evaporated state during the process of drying. Consequently, this would result in efflorescence. Therefore, the tendency of the solid salts to cluster upon the evaporating surface and to accumulate thereupon at those points where the evaporation is greatest is substantially eliminated. The depositing of some of the dextrinized starch which has been dissolved upon the surface of the mold or cast, where it subsequently hardens, also has a tendency to prevent salts from depositing upon the surface of the mold. Thus, we have found that by the use of dextrinized starch substantially all efflorescence is prevented.

For aiding in the liberation of the carbon dioxide gas from the granular sodium bicarbonate ingredient, we use aluminum sulphate (alum).

Partially calcined gypsum constitutes the major ingredient of our composition of materials. When water is added to the ingredients or when the mixture is gauged with water, the gypsum also reacts with the sodium bicarbonate granules and thus aids in liberating the carbon dioxide gas therefrom. The gypsum is the material which sets when mixed with water thereby imparting the main structural strength to the final product or cast. The final cellular product resulting from the composition hereinbefore described is firm and hard, and by reason of the efficiency of the granular sodium bicarbonate, soap bark and dextrinized starch, relatively small quantities of these materials may be employed with highly advantageous results. The final product makes a highly efficient sound and heat insulating medium that may be employed for partitions, roof and floor fill, etc. in a building structure and other structures.

The mixture may be marketed in dry form in suitable containers and gauged on the job or it may be cast into blocks or slabs and sold as such.

Under some conditions, and particularly when the gypsum is of a so-called "sticky" variety as some gypsums are, it may be desirable to employ an inert aggregate in our composition of materials. When such an aggregate is used we prefer to employ fine silica sand or a fine siliceous sand in lieu of coke, cinders, charcoal and the like which have heretofore been proposed as inert aggregates. We have found that fine silica sand possesses certain valuable characteristics that render it highly suitable for this purpose in addition to being cheap and readily available at all places. When employing sand as one of the ingredients of our improved composition of materials, and particularly when the gypsum ingredient is of a "sticky" variety, we render it possible to accomplish a more thorough and uniform intermixing of the ingredients in their dry state and a quicker mix of the mortar when the dry ingredients are gauged with water. Moreover, fine silica sand serves to break up any lumps that are likely to be present in the dry mix and, furthermore, the fine silica sand allows water to diffuse substantially equally and rapidly throughout the entire mass during job mixing.

Consequently, a mortar is very quickly obtained, the gas is liberated more evenly throughout the mass, the mass is more easily poured and rendered more uniform in texture throughout which results in eliminating the formation of thick heavy masses or thin watery masses within the body of the mortar or poured cast. Consequently, a cellular product of uniform porosity results. By reason of the fact that the fine silica sand aids in quicker and easier mixing of the gauged mixture, it prevents loss of gas around the fringes of the cast which otherwise would obtain if the ingredients reacted before the mortar mass had attained sufficient body to entangle and entrain the bubbles.

In certain mixtures we find that it is preferable to omit the sand and this is particularly true when the gypsum ingredient is dry and only slightly "sticky" or when the final products possess very light weights per unit of volume.

We have hereinbefore enumerated some of the advantages of sodium bicarbonate granules over powdered sodium bicarbonate. Among other advantages of employing sodium bicarbonate granules we may mention that a dry mix incorporating sodium bicarbonate granules may be readily poured and handled, inasmuch as all tendency for the dry mix to cake and lump up is substantially eliminated. The sodium bicarbonate granules, moreover, tend to go into solution immediately when gauging the mixture with water and precludes after-rising of the mortar before setting.

While we prefer to employ aluminum sulphate because of its availability and cheapness, ordinary potash alum (potassium aluminum sulphate) may be substituted therefor. In lieu of dextrinized starch (HHH gum) we may substitute other dextrines, gum arabic and the like, although we have found dextrinized starch as being highly satisfactory. In instances where it is desired to employ an inert aggregate we prefer to use fine silica sand but in lieu thereof cinders, ashes, coke or other aggregates may be utilized.

When gauging our composition of ingredients it is desirable to employ sufficient water to render the mass fluid to a pouring or casting consistency.

It is not absolutely essential that a granulated sodium bicarbonate be used inasmuch as under certain conditions and in lieu of granular sodium bicarbonate we may use other water-soluble carbonates, such as normal sodium carbonate.

While we have described in detail our present invention, it is to be understood that we do not desire to be limited to the specific proportions and materials that we have referred to and, moreover, we desire that only such limitations be imposed upon our invention as are set forth in the appended claims.

We claim:

1. A heat and sound insulation material which is substantially non-efflorescent, durable and of a homogeneous cellular texture which results from the gauging with water of a mixture comprising partially calcined gypsum as the major ingredient, sodium bicarbonate, a water-soluble acid reacting salt, soap bark and dextrinized starch.

2. A heat and sound insulation material which is substantially non-efflorescent, durable and of a homogeneous cellular texture which results from the gauging with water of a mixture comprising partially calcined gypsum as the major ingredient, a water-soluble bicarbonate, a water-soluble acid reacting salt, soap bark, and a gas entangling substance.

3. A heat and sound insulation material which is substantially non-efflorescent, durable and of a homogeneous cellular texture which results from the gauging with water of a mixture comprising partially calcined gypsum as the major ingredient, granular sodium bicarbonate, a relatively small percentage of siliceous sand as compared with the gypsum, and soap bark.

4. A heat and sound insulation material which is substantially non-efflorescent, durable and of a homogeneous cellular texture which results from the gauging with water of a mixture comprising partially calcined gypsum as the major ingredient, granular sodium bicarbonate, a relatively small percentage of fine sand as compared with said gypsum, soap bark, and gum.

5. A heat and sound insulation material which is substantially non-efflorescent, durable and of a homogeneous cellular texture which results from the gauging with water of a mixture comprising partially calcined gypsum as the major ingredient, a water-soluble bicarbonate, a water-soluble salt of an insoluble hydroxide forming metal, a gas entangling substance and sand.

6. A dry mix suitable for making cellular plaster casts possessing a substantially homogeneous cellular texture and comprising partially calcined gypsum as the major ingredient, a water-soluble granular carbonate compound, an acid-reacting salt, and powdered soap bark.

7. A dry mix suitable for making cellular plaster casts possessing a substantially homogeneous cellular texture and comprising partially calcined gypsum as the major ingredient, a water-soluble granular carbonate compound, an acid-reacting salt, powdered soap bark, and dextrinized starch.

8. A dry mix suitable for making cellular plaster casts possessing a substantially homogeneous cellular texture and comprising partially calcined gypsum as a major ingredient, a granular water-soluble carbonate compound, an acid-reacting salt, a foam producing agent, and fine siliceous sand.

9. A dry mix suitable for making cellular plaster casts possessing a substantially homogeneous cellular texture and comprising partially calcined gypsum as the major ingredient, granular sodium bicarbonate, an acid-reacting salt, powdered soap bark, and a gum.

10. A dry mix suitable for making cellular plaster casts possessing a substantially homogeneous cellular texture and comprising partially calcined gypsum as the major ingredient, granular sodium bicarbonate, alum, soap bark, and dextrinized starch.

11. A dry mix suitable for making cellular plaster casts possessing a substantially homogeneous cellular texture and comprising partially calcined gypsum as the major ingredient, granular sodium bicarbonate, an acid-reacting salt, fine sand, soap bark, and dextrinized starch.

12. A dry mix comprising partially calcined gypsum, a small percentage of sodium bicarbonate in granular form not exceeding 3% of the weight of the mixture, a small amount of an acid-reacting salt not exceeding 6%, fine sand not exceeding 15%, a small amount of soap bark not exceeding .5%, and a small amount of dextrinized starch not exceeding 1%.

13. A heat and sound insulation material which is substantially non-efflorescent and of a homogeneous cellular texture and weighing not over 30 pounds per cubic foot, which results from the gauging with water of a mixture comprising gypsum, a relatively small percentage of alum and granular sodium bicarbonate, dextrinized starch, and soap bark.

In witness whereof, we have hereunto subscribed our names.

HARRY E. BROOKBY.
GEORGE D. KING.